M. J. Wine.
Harvester Rake.
Nº 83,578. Patented Oct. 27, 1868.
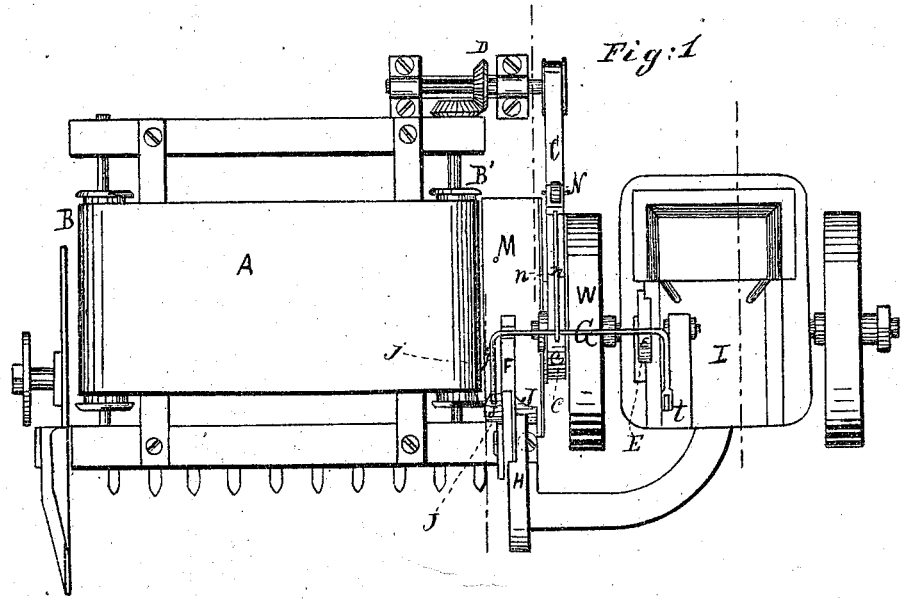
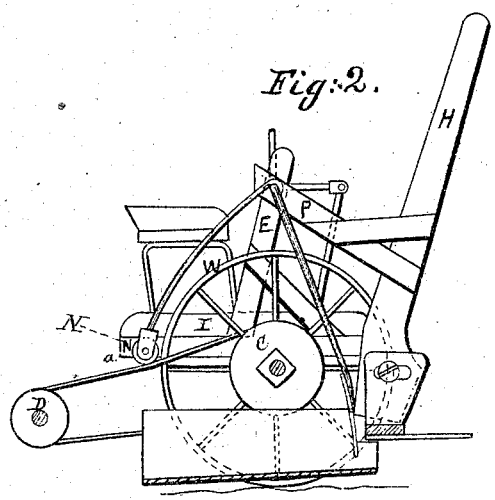
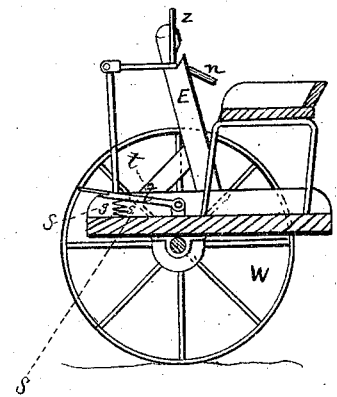
Witnesses
Chas. A. Pettit
S. C. Kemon
Inventor
M. J. Wine
by Munn & Co.
Attorneys

UNITED STATES PATENT OFFICE.

MILETUS J. WINE, OF LONG GLADE, VIRGINIA.

IMPROVEMENT IN HARVESTERS.

Specification forming part of Letters Patent No. 83,578, dated October 27, 1868.

*To all whom it may concern:*

Be it known that I, MILETUS J. WINE, of Long Glade, in the county of Augusta and State of Virginia, have invented a new and Improved Reaping-Machine; and I do hereby declare that the following is a full, clear, and exact description of the construction and operation of the same, reference being had to the accompanying drawings, making a part of this specification, in which—

Figure 1 is a top view. Fig. 2 is a longitudinal vertical section; Fig. 3, a detached sectional view, showing the operation of the treadle and spring.

The object of this invention is to provide a simple and more efficient means for removing and depositing the gavel.

To accomplish this object, I construct my reaping-machine with an endless apron, parallel to the sickle and directly behind it, which receives the cut grain and deposits it in a chute between the apron and the right wheel of the machine. In connection with this is a rake, worked by a treadle near the driver's seat, which, at the option of the driver, is caused to sweep along the chute and throw out the gavel that has been deposited therein by the apron. Attached to the shaft that supports the rake is an idle-pulley, for tightening the belt that operates the apron, and it is so constructed that, when the treadle or arm is depressed in order to clean out the chute, the pulley is thereby raised from the belt, and the apron stops. When the chute has been emptied the rake is returned to its place, and the pulley again brought into connection with the belt, either by the weight of the respective parts, by a spring, or by the operator reversing the treadle with his foot.

In the drawings, A is the apron, running upon two rollers, B B', one of which, B', is actuated from the hub of the right-hand draft-wheel, W, by means of a belt, C, connecting a pulley, c, on said hub with a shaft, D, which carries a bevel-wheel that gears with another on the roller.

M is a chute or spout between the roller B' and the wheel W, which receives the cut grain from the apron A. E is a standard attached to or near the side of the driver's seat or platform I, and F is an arm projecting backward from the reel-post H. Bearing in these two parts is a rock-shaft, G, which can be rocked in one direction by the treadle t or arm z, and in the other by the treadle or arm, or by a spring, s, acting upward against the treadle.

To the outer end of the rock-shaft a rake, J, is attached by means of an arm, j, in such a manner that it ordinarily stands at the forward end of the chute, leaving the grain to be deposited behind it. Directly over the belt C another arm, n, is rigidly attached to the rock-shaft, and at its outer end supports an idle-pulley, N, which rests upon the belt C when the rake is in the position shown in Fig. 2, and thus tightens the belt, and causes the latter to rotate the apron A.

When the treadle t is depressed by the driver's foot, the motion of the rock-shaft throws the rake back and clears the chute, depositing the gavel on the ground, while at the same instant it lifts the pulley from the belt, slackens the latter, and stops the revolution of the apron, so that no more grain is deposited in the chute till the rake has resumed its place, as seen in Fig. 2. The rake may be brought back to this position by its own weight and that of the pulley, by the operation of the spring s, or by the reverse action of the driver's foot upon the lever.

The whole apparatus is simple and very efficient in operation. It can be readily and at little expense applied to any of the common two-wheel harvesters.

Having thus described my invention, what I claim as new, and desire to secure by Letters Patent, is—

1. The chute M, having its rear end left open, and attached only to the finger-bar at its front end, when arranged between the grain-wheel W and the apron A and below the level of the latter, in the manner and for the purpose specified.

2. In connection with the belt C for moving the apron A and the chute M for receiving the grain from the said apron, the rock-shaft G, the rake J, the idle-pulley N, and the treadle t or arm z, when combined and arranged to operate in the manner and for the purposes substantially as specified.

MILETUS J. WINE.

Witnesses:
CHAS. A. PETTIT,
SOLON C. KEMON.